United States Patent Office 3,474,143
Patented Oct. 21, 1969

3,474,143
SIDE CHAIN ALKYLATION OF AROMATIC
TERTIARY AMINES
Walter A. Butte, Jr., West Chester, Pa., assignor to Sun
Oil Company, Philadelphia, Pa., a corporation of New
Jersey
No Drawing. Filed July 1, 1966, Ser. No. 562,130
Int. Cl. C07c 87/28; C07b 27/00; C08f
U.S. Cl. 260—570.8                                             4 Claims

ABSTRACT OF THE DISCLOSURE

N,N-dialkyl - N - aralkylamines are alkylated with ethylene in the presence of a catalyst system comprising a combination of certain non-aromatic tertiary amines with LiR, wherein R is a hydrocarbon radical having 1–30 carbon atoms.

---

This invention pertains to the alkylation of N,N-dialkyl-N-aralkylamines to yield products useful for many purposes.

The process involves a telomerization reaction in which an aromatic tertiary amine of the foregoing category is the telogen, in which ethylene is the alkylation reactant, and in which the catalyst is a hydrocarbolithium-non-aromatic tertiary amine complex to be hereinafter more particularly described.

The reaction is illustrated by an equation as follows:

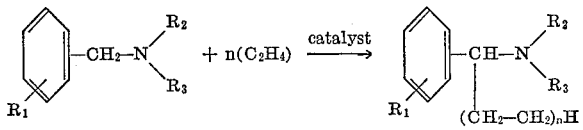

in which $R_1$ is hydrogen or alkyl; $R_2$ is alkyl; $R_3$ is alkyl; and $n$ is a positive integer.

The catalyst system is a combination of a non-aromatic tertiary amine with LiR, wherein R is a hydrocarbon radical having 1–30 carbon atoms.

The mechanism of the overall reaction involves first, a transmetallation reaction, and then, a telomerization reaction which in those instances when $n$ in the product is an integer greater than 1, includes a chain propagation reaction.

The first step in initiating the reaction involves the transfer of a lithium atom from the catalyst complex to the carbon atom which is alpha to the aryl group, and replacement of a hydrogen atom thereon by the Li. The next step involves the addition by telomerization of one or more ethylene molecules between the Li atom and the carbon atom to which Li becomes attached in the first step.

The telomerization reaction terminates, for any particular aromatic amine molecule undergoing telomerization, due to transmetallation, whereby the Li atom at the end of the reaction chain transfers with an alpha hydrogen atom on another molecule of the aromatic amine reactant, in the same manner as initially occurred. The newly formed lithiated aromatic amine molecule then undergoes reaction in a similar reaction cycle, and the mechanism is repeated.

Thus it can be seen that the overall reaction is truly catalytic, so that the catalyst theoretically would last forever. As a practical matter, however, reaction conditions are controlled so as to obtain a suitable yield of the desired product or products of chosen $n$ values, whereupon the catalyst is deactivated in any suitable manner. This is followed by the working up of the reaction mixture to recover the desired product or products, and any unreacted charged aromatic amine.

Water or a lower molecular weight aliphatic alcohol, e.g., methyl alcohol, are quite useful in the deactivation of the catalyst.

The length of the alkyl side chain and hence the average molecular weight of the alkylated products produced in the process can be controlled by appropriate regulation of the process variables. The average product molecular weight obtained depends upon the rate of the chain propagation reaction (chain propagation usually being present at least to a minor degree even though the desired value of $n$ is 1), relative to the rate of the transmetallation reaction. This is because the latter functions to terminate the former.

The rate of chain propagation depends largely on the ethylene pressure employed in the reaction zone, whereas the transmetallation reaction is largely unaffected, if at all, by ethylene pressure. Hence the average length of the alkyl side chain can be increased by raising the ethylene pressure, and decreased by reducing it.

On the other hand, the rate of transmetallation increases with increase in concentration of the aromatic amine reactant in the reaction zone, and decreased by reducing it, e.g., by the use of a large amount of solvent, inert for practical purposes, in the reaction zone.

Accordingly, to obtain a major yield of product in which the value of $n$ is 1, lower ethylene pressures preferably should be used along with relatively high concentrations of aromatic amine reactant in the reaction zone, and to obtain a major yield of product in which the value of $n$ is gerater than 1, the reverse preferably should be used, it being understood that either influencing factor may be employed without the other to obtain the result that may be desired.

Apparently the rates of transmetallation and propagation vary approximately equally with change in reaction temperature, so that the overall reaction rate may be increased with increase in temperature, without largely affecting the average length of the alkyl side chain attached to the alpha carbon atom as a result of the reaction.

Thus while reaction conditions of temperature, pressure and concentration of aromatic amine in the reaction zone may vary over a wide range conformable to the production of the desired end products, temperature conditions are usually held between 30° C. and 120° C., preferably between 70° C. and 100° C., and ethylene pressure conditions usually between several atmospheres and several hundred atmospheres, e.g., 20–5,000 p.s.i.g., but preferably between 100 and 1,000 p.s.i.g.

Examples of solvents useful for controlling concentration in accordance with the wishes of the operator upon becoming familiar with this invention, and conformable with desired results, are the liquid hydrocarbons, and particularly those of saturated structure, such as paraffins or cycloparaffins, e.g., hexane, cyclohexane, octane, and the like. On the other hand, the reaction may be conducted in the absence of solvent.

For any particular set of operating conditions, products are usually produced of different length of alkyl chain substituted for hydrogen on the alpha carbon atom, so that the final reaction mass usually contains a mixture of alkylated aromatic tertiary amines having a range of molecular weights. The molecular weight of the major product, however, is within the control of the operator by appropriate adjustment of reaction conditions as discussed above, particularly ethylene pressure and concentration of aromatic amine reactant in the reaction zone. This is particularly true when the desired value for $n$ is 1 in the major product.

As previously indicated, the essential ingredients of the catalyst are a hydrocarbolithium compound LiR having 1–30 carbon atoms and a non-aromatic tertiary amine. These components when admixed form coordination compounds which are the active catalyst species. The R group of the lithium compound can be any hydrocarbon radical of the specified number of carbon atoms selected from the group consisting of alkyl, cycloalkyl, alkenyl, phenyl, cycloalkenyl, alkylphenyl and phenylalkyl. The following are examples of suitable R groups for the LiR component: ethyl, propyl, isopropyl, n-butyl, isobutyl, tertiary butyl, n-amyl, isoamyl, n- or isooctyl, n- or isodecyl, lauryl, cyclopentyl, methylcyclohexyl, methylcyclopentyl, ethylcyclohexenyl, phenyl, benzyl, tolyl, xylyl, cumyl, methylbenzyl, propylbenzyl, 2-phenylethyl, allyl, crotyl and the like. Preferably LiR is an alkyl lithium in which the alkyl group has 2–10 carbon atoms.

The amine component can be any non-aromatic tertiary amine which is a diamine or an amine containing bridgehead nitrogen. While any such amine in combination with LiR as above described will function in the desired manner, certain kinds of amines within the class defined give best results and hence are preferred. Particularly good results are obtained with chelating diamines, i.e., diamines in which the two nitrogen atoms are so spaced in the molecule that the diamine can form a chelate with the lithium atom of the LiR component. Examples of chelating diamines which do not have any rings in their molecular structures are as follows: N,N,N',N'-tetramethylethylene diamine; N,N,N',N'-tetraethylpropylene diamine; N,N,N',N'-tetrapropylethylene diamine; and N,N,N',N'-tetrahexylpropylene diamine. The following are examples of chelating diamines which contain one or more rings in the molecule: N,N,N',N'-tetraalkyl-1,2-diaminocyclohexane; N,N,N',N'-tetraalkyl-2,3-diaminodecalin; N,N,N', N'-tetraalkyl-1,8-diaminodecalin; N,N'-dialkylbispidin; 1, 2 - bis(1 - piperidyl) - ethane; 1,3 - bis(1-pyrrolidinyl)-propane; and 1-methyl-2-dimethylaminomethylpiperidine.

Another preferred type of amine for use in practicing the invention comprises those non-aromatic tertiary amines in which one or more of the nitrogen atoms are at a bridgehead position, by which is meant that all three valences of the nitrogen participate in ring systems. The preferred amine of this type is triethylene diamine, which also can be designated 1,4-diaza[2.2.2]bicyclooctane, which has the following structure:

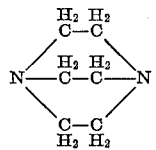

This bridgehead amine is non-chelating but it also will form a coordination complex with the LiR component which complex is particularly effective for the present purpose. Another amine of the bridgehead type is the monoamine, quinuclidine or 1,4-ethylene piperidine, which has a structure like the foregoing except that one of the nitrogen atoms is replaced by a CH group. Likewise 1-aza[2.2.1]bicycloheptane is an example of a bridgehead monoamine that can be used. Still other amines that can be used are the aza-adamantanes which structurally resemble adamantane except that one or more nitrogen atoms are substituted at bridgehead positions in place of carbon.

A particularly effective chelating diamine for use in practicing the invention is the alkaloid, sparteine, which has the formula

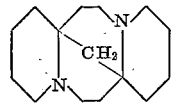

This compound is both a chelating and bridgehead diamine.

Non-aromatic tertiary diamines other than those which are chelating or of the bridgehead type as discussed above also can be used in practicing the invention although they generally give lower rates of transmetallation and hence require longer times for completion of the reaction. Examples of such other tertiary diamines that can be used are the following: N,N,N',N'-tetramethylmethylene diamine; N,N,N',N'-tetramethylhexamethylene diamine; N, N'-dimethylpiperazine; 1-methyl-3-dimethylaminopyrrolidine; 1-methyl-4-dimethylaminopiperidine; and the like.

The ratio of the non-aromatic tertiary amine to the lithium compound incorporated in the reaction mixture can vary widely. For example, the amounts of these catalyst components used can be such that the atomic ratio of nitrogen is lithium (N:Li) in the catalyst system varies from 0.1:1 to 100:1. A more desirable range of atomic ratios of N:Li within which to operate is from 0.5:1 to 20:1 and it is preferable to employ the amine in at least the stoichiometric amount for forming its coordination complex with the LiR component. For chelating amines of the molecularly rigid sub-type little if any advantage usually is gained by using more than the stoichiometric amount. However for other types of non-aromatic tertiary amines better catalyst activity and longer life often can be obtained by utilizing a substantial excess of the non-aromatic tertiary amine relative to the lithium component, for example, 5–10 times the stoichiometric amount required for forming the coordination complex.

In preparing the reaction mixture the catalyst components can be added to the reactor containing the aromatic amine to be reacted, thus forming the catalyst species in situ; then add ethylene under pressure and heat the mixture to a temperature necessary for effecting the telomerization reaction. On the other hand, the catalyst may be pre-formed by combining the non-aromatic amine and the lithium compound in an inert solvent, such as hexane or decane, and the pre-formed catalyst may then be added to the reactor. Other procedures can be employed.

In carrying out the reaction precautions are preferably taken to exclude significant amounts of air and moisture from the system to avoid poisoning of the catalyst. Hydrogen also acts as a catalyst poison, and hence the ethylene used ought not to contain free hydrogen.

The compatibility of the aromatic tertiary amine reactant with the catalyst complex is surprising, for many amines undergo a cleavage reaction with organolithium compounds, leading to rapid deactivation of the catalyst. $R_1$, $R_2$ and $R_3$ of the aromatic tertiary amine reactant are each alkyl, e.g., 1–20 carbon atoms, and preferably have 1–10 carbon atoms. The absence of highly reactive functionalities such as carbonyl, hydroxyl, amino(—NH), carboxyl, and nitro is to be noted. These groups would react rapidly with the catalyst in a stoichiometric rather than in a catalytic fashion. The same is true of compounds having polyunsaturated olefinic linkages, as well as of polynuclear aromatics having radicals such as butadienyl and naphthyl. Primary and secondary aromatic amines also are excluded as inoperable as reactants. It becomes apparent from the foregoing, and as the applicant has discovered, that the reactive aromatic tertiary amine must be chosen from a very limited group.

Examples of alkyl radicals are methyl, ethyl, propyl, butyl, amyl, hexyl, heptyl, octyl, nonyl and decyl, including the various isomeric forms.

Examples of aromatic tertiary amines are dimethylbenzylamine, diethylbenzylamine, dimethyltolylamine, methylethylbenzylamine, methyloctylbenzylamine, and the like.

In a typical run in accordance with the invention, amine telogen, diluent, if any, and catalyst or catalyst components are charged to a pressure vessel which thereafter is kept at operating temperature. Ethylene is added in a continuous fashion so that it is replenished as it reacts, e.g., by maintaining a constant pressure. When the reaction has run a desired course or subsides, excess ethylene is vented from the reactor, and the reaction mass removed. After removal of diluent and/or unreacted starting material, e.g., by distillation, a crude trialkylamine product is obtained which may be used as such, or further fractionated by distillation or crystallization.

The trialkylamines thus obtained, in admixture or in isolated form, may be transformed into other useful products by known reactions. In particular, trialkylamines can be converted to quaternary ammonium salts to provide useful surface active agents. As is well known, tertiary alkyl amines can be reacted with alkyl halides, such as alkyl chlorides, to yield quaternary ammonium salts which are surfactive agents, e.g., detergents, wetting agents and/or emulsifiers characterized by having bactericidal properties. The products produced by the method of the invention are particularly useful for such purposes. They also are useful as corrosion inhibitors in lubricating oils, and as intermediates in the manufacture of dyes and rubber chemicals.

The following is given by way of illustration, and not of limitation.

EXAMPLE

A stainless steel autoclave was charged with 100 parts of N,N-dimethylbenzylamine, 12 parts of butyllithium dissolved in 100 parts of hexane, 24 parts of N,N,N',N'-tetramethylethylene diamine, and 400 parts of heptane. The reaction mixture was heated to 90° C., and ethylene was introduced from a reservoir at 300 p.s.i.g. The reaction was allowed to proceed for 15 minutes, whereupon unreacted ethylene was vented.

Upon subjecting the reaction mass to fractional distillation, the solvent was removed followed by 40 parts of unreacted N,N-dimethylbenzylamine, leaving 85 parts of higher boiling residue. Further distillation yielded 65 parts of 1-dimethylamino-1-phenyl-propane, B.P. 110–112 at 19 mm. Hg, which was identified on the basis of elemental analysis, infrared spectrum, nuclear magnetic resonance spectrum, and mass number.

Gas chromatography of the final distillation residue showed that it contained a series of products which on the basis of mass number, nuclear magnetic resonance spectra, and infrared spectra were shown to be even carbon-chain homologs, i.e., 1-dimethylamino-1-phenyl-pentane, 1-dimethylamino-1-phenyl-heptane, 1-dimethylamino-1-phenyl-nonane, etc.

When other aromatic tertiary amines to which the invention relates are substituted for N,N-dimethylbenzylamine employed in the above example, analogous reactions occur with the production of analogous products. The same applies when other LiR compounds and/or other non-aromatic tertiary amines, as defined herein, are employed in place of those used in said example. Likewise conditions of reaction are subject to wide variation; all of which provides wide versatility.

Thus, having particularly described the invention, it is to be understood that this is by way of illustration and not of limitation, for changes, omissions, additions, substitutions and/or other modifications may be made without departing from the spirit thereof. Accordingly it is intended that the patent shall cover, by suitable expression in the claims, the various features of patentable novelty that reside in the invention.

I claim:
1. Method for the alkylation of an aromatic tertiary amine having the formula:

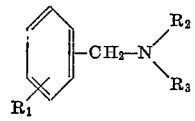

in which $R_1$ is hydrogen or an alkyl radical having 1–10 carbon atoms, and each of $R_2$ and $R_3$ is an alkyl radical having 1–10 carbon atoms, which comprises:

(a) contacting the aromatic tertiary amine with ethylene at at least 20 p.s.i.g. and at a temperature of at least 30° C. in the presence of a catalyst system comprising a combination of a non-aromatic tertiary amine which is a diamine or an amine containing bridgehead nitrogen with LiR wherein R is a hydrocarbon radical having 1–30 carbon atoms selected from the group consisting of alkyl, cycloalkyl, alkenyl, cycloalkenyl, phenyl, alkylphenyl and phenylalkyl;

(b) and removaing from the reaction mixture an alkylated aromatic tertiary amine product corresponding to the original amomatic tertiary amine but having an unbranched alkyl group substituted at the benzylic carbon atom adjacent the nitrogen atom.

2. Method according to claim 1 wherein pressure conditions fall between 100–1,000 p.s.i.g., and temperature conditions between 70–120° C.

3. Method according to claim 1 wherein LiR is an alkyl lithium containing 2–10 carbon atoms, and wherein the non-aromatic tertiary amine is a chelating diamine or an amine containing bridgehead nitrogen.

4. Method according to claim 3 wherein LiR is butyllithium, wherein the non-aromatic tertiary amine is N,N,N',N'-tetramethylethylene diamine, and wherein the aromatic tertiary amine is N,N-dimethylbenzylamine.

References Cited
UNITED STATES PATENTS

| | | | |
|---|---|---|---|
| 2,663,724 | 12/1953 | Pines et al. | 260—465 |
| 3,206,519 | 9/1965 | Eberhardt | 260—671 |
| 3,256,345 | 6/1966 | Solomon | 260—570.9 X |

ROBERT V. HINES, Primary Examiner

U.S. Cl. X.R.

252—50, 106, 390, 431; 260—567.6, 999